US009163612B2

(12) United States Patent
Smook

(10) Patent No.: US 9,163,612 B2
(45) Date of Patent: Oct. 20, 2015

(54) WIND TURBINE NACELLE

(75) Inventor: Warren Smook, Huldenberg (BE)

(73) Assignee: ZF Wind Power Antwerpen N.V., Lommel (BE)

( * ) Notice: Subject to any disclaimer, the term of this patent is extended or adjusted under 35 U.S.C. 154(b) by 778 days.

(21) Appl. No.: 13/465,178

(22) Filed: May 7, 2012

(65) Prior Publication Data

US 2012/0294720 A1    Nov. 22, 2012

(30) Foreign Application Priority Data

May 18, 2011    (EP) .................................... 11166598

(51) Int. Cl.
| F03D 11/02 | (2006.01) |
| F16H 1/28 | (2006.01) |
| F16H 1/46 | (2006.01) |

(52) U.S. Cl.
CPC ....... *F03D 11/02* (2013.01); *F05B 2260/40311* (2013.01); *F16H 1/28* (2013.01); *F16H 1/46* (2013.01); *Y02E 10/722* (2013.01); *Y02E 10/726* (2013.01)

(58) Field of Classification Search
CPC ........ F03D 1/003; F03D 1/0691; F03D 11/02
See application file for complete search history.

(56) References Cited

U.S. PATENT DOCUMENTS

| 4,008,006 | A | * | 2/1977 | Bea ............................... 417/271 |
| 4,871,923 | A | * | 10/1989 | Scholz et al. .................... 290/55 |
| 6,232,673 | B1 | | 5/2001 | Schoo et al. |
| 7,944,077 | B2 | * | 5/2011 | Fischer et al. ................... 290/55 |
| 2010/0032961 | A1 | | 2/2010 | Numajiri |
| 2010/0164232 | A1 | | 7/2010 | Siegfriedsen |
| 2011/0068583 | A1 | | 3/2011 | Burkart |
| 2011/0097202 | A1 | | 4/2011 | de Buhr et al. |

FOREIGN PATENT DOCUMENTS

| CA | WO2010118509 | * | 10/2010 | ................ F03D 3/04 |
| DE | 296 09 794 U1 | | 10/1996 | |
| DE | 10 2007 012 408 A1 | | 9/2008 | |
| EP | 0037002 | * | 10/1981 | .............. F03D 11/00 |
| EP | 1 677 004 A2 | | 7/2006 | |
| EP | 2 253 843 A1 | | 11/2010 | |
| WO | 2007/082970 A1 | | 7/2007 | |
| WO | 2009/132671 A2 | | 11/2009 | |
| WO | 2010/130717 A1 | | 11/2010 | |
| WO | 2011/058184 A2 | | 5/2011 | |

* cited by examiner

*Primary Examiner* — Richard Edgar
*Assistant Examiner* — Brian O Peters
(74) *Attorney, Agent, or Firm* — Davis & Bujold, P.L.L.C.; Michael J. Bujold

(57) ABSTRACT

A wind turbine nacelle (50) which comprises a frame (54) and a drive train which comprises a gearbox (55). The nacelle (50) has a rotor attached thereto and comprises a rotor hub (52), with one or more blades (53), which supported by a rotor bearing(s) (56) located on a tubular part (57) at an end of the frame (54) furthest from the tower (51). The gearbox (55) comprises a gearbox housing (58), not constituting part of the frame (54), which is rigidly and axially connected to the frame (54) by a gearbox flange (66) such that a side of the gearbox flange (66), furthest from the gearbox input side (I), is connected to an end of the frame flange (67) furthest away from the tower (51). An input shaft (76) of the gearbox (55) is connected to the rotor hub (52) via a separate connection part (77).

15 Claims, 10 Drawing Sheets

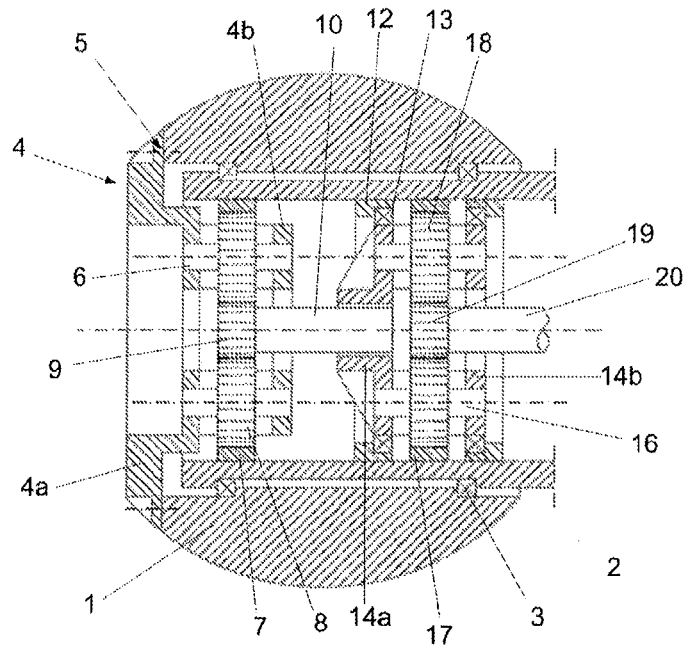
FIG. 1 – PRIOR ART
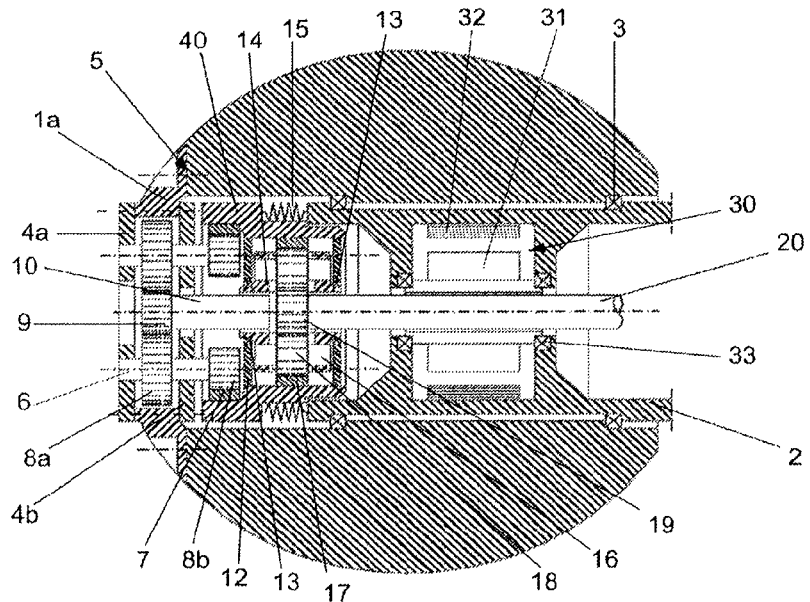
FIG. 2 – PRIOR ART

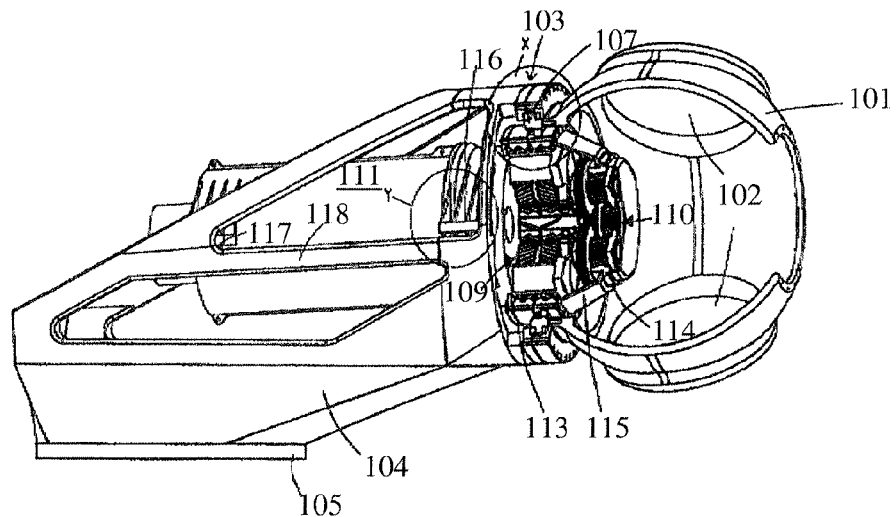
FIG. 3 – PRIOR ART
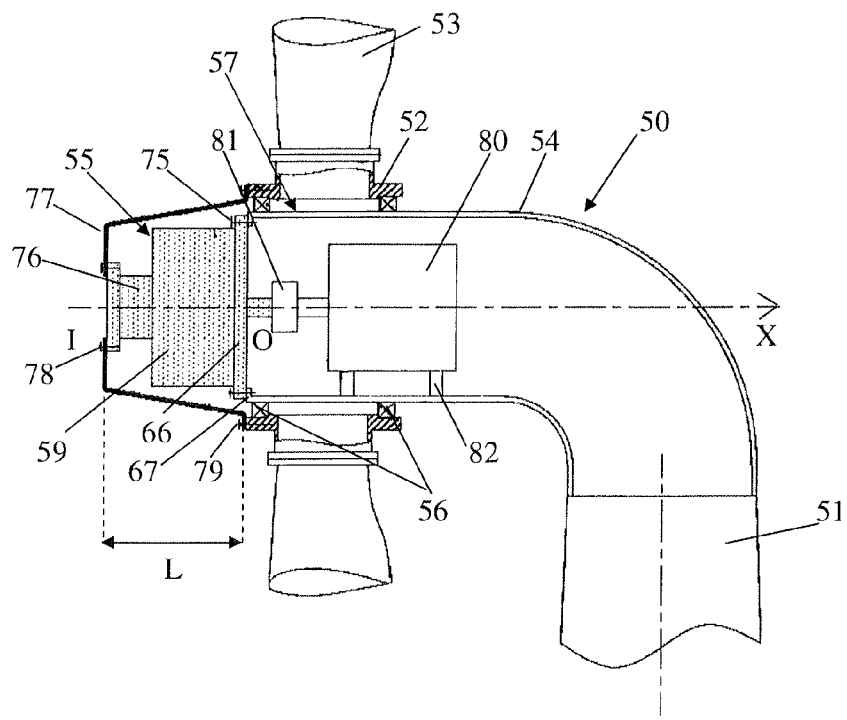
FIG. 4

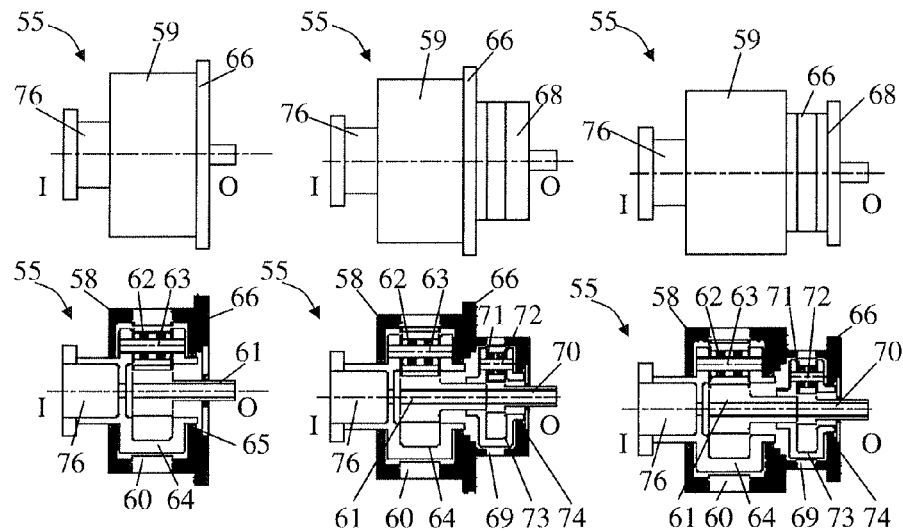
FIG. 5a  FIG. 5b  FIG. 5c
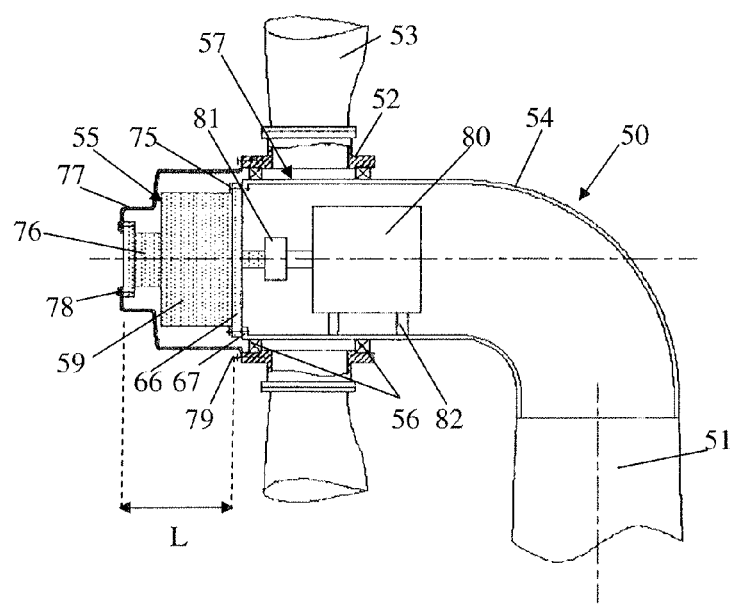
FIG. 6

WIND TURBINE NACELLE

This application claims priority from European Patent application serial no. 11166598.0 filed May 18, 2011.

TECHNICAL FIELD OF THE INVENTION

The present invention relates to a wind turbine nacelle for being mounted on a wind turbine tower.

BACKGROUND OF THE INVENTION

Nowadays, a lot of effort is put in optimising the cost of energy of wind turbines. Cost of energy comprises three main items, i.e. capital expenditures (capex), operation and maintenance costs (O&M costs) and annual energy production (AEP). To improve the cost of energy of a particular wind turbine type, one, two or each of the different items can be tackled.

One way of handling the O&M costs is by focusing on improving and simplifying servicing of the wind turbine. Servicing, e.g. maintenance or component replacement of wind turbine drive train components such as a gearbox and/or generator, is in many cases a difficult and expensive activity. Therefore, wind turbine designs should not only be reliable such that servicing activities can be limited, but should also be service friendly, such that servicing, when necessary, can be performed easily and at low cost.

Nowadays, a lot of effort is done for finding solutions for making servicing activities of wind turbines easier and less expensive.

WO 2010/130717 describes a wind turbine comprising a hub 1 carrying one or more blades, a frame 2 and planetary gearing for transmitting the torque of the hub 1 (see FIG. 1). The hub 1 is rotatably mounted upon the frame 2 at or near a distal end thereof by means of bearings 3. The torque of the hub 1 is introduced into the planetary gearing through a planet carrier 4 which is located at or near the distal end of the frame 2. The hub 1 may therefore be connected to the planet carrier 4 at various connection points 5 around the circumference of the hub 1. The planet carrier 4 may be one integral element or may be formed with a first part 4a and a second part 4b connected to each other. The connection may be formed by simple fasteners such as screws or bolts. Alternatively, the connections may comprise at least one elastic element such as flexible bushings. Planet shafts 6 are rotatably supported at both ends within the planet carrier 4. An annular gear 7 is arranged around planet gear wheels 8. The torque of the hub 1 is in this way transmitted from the planet carrier 4 to a sun gear 9 mounted on an output shaft 10 of the first stage. The planetary gearing comprises a second stage comprising a planet carrier 14 carrying a plurality of planet gear wheels 18 upon planet shafts 16. First stage output shaft 10 functions as input shaft for the second stage. The torque is transmitted through the planet carrier, which is formed of separate elements 14a and 14b. The planet carrier 14 is rotatably mounted through bearings 13 upon a support structure 12. Planet gear wheels 18 rotate within second stage annular gear 17, whereas second stage sun gear 19 is mounted upon second stage output shaft 20.

The drive train described above is relatively compact, and is substantially completely housed within the frame 2. Repair and installation of gearing is relatively simple, because the configuration allows easy access to the remainder of the gearing by simply removing the planet carrier 4 from the hub 1.

Another embodiment described in WO 2010/130717 is illustrated in FIG. 2. In this embodiment, the hub 1 comprises an extension 1a, connected to the hub 1 at various connection points 5. The planet shafts 6 are cantilever mounted and the planet gear wheels 8 comprise double gearing, first gearing 8a meshing with sun gear 9 and second gearing 8b meshing with annular gear 7.

First stage output shaft 10 serves as second stage input shaft and carries second stage planet carrier 14. Planet carrier 14 is rotatably mounted through bearings 13 in support structure 12. Planet gear wheels 18 mounted upon planet shafts 16 transmit the rotation to second stage sun gear 19 and second stage output shaft 20. Second stage output shaft 20 is rotatably mounted through bearings 33 in the housing of the generator 30. The generator 30 comprises a generator rotor 31 and a stator 32. Generator rotor 31 is driven by second stage output shaft 20. The generator housing is integrally formed with frame 2, upon which hub 1 is rotatably mounted through suitable bearings 3.

In the embodiment illustrated in FIG. 2 no part of the planetary gearing is mounted within frame 2. Instead, the components of the second stage of the planetary gearing are mounted within a support structure 40 arranged within hub 1, forward of frame 2. An advantage of the arrangement with the forward support structure 40 is that both installation and maintenance of the planetary gearing is facilitated; easy access to the planetary gearing is ensured.

Support structure 40 may be connected to frame 2 through a flexible connection 15 which can only transmit axial torque. The advantage of a coupling 15 that only transmits torque is that support structure 40 and also the planetary gearing carry no substantial bending loads. All cyclical loads due to e.g. weight of the hub 1 are transmitted only to frame 2. This may reduce the fatigue loads on the gearing and increase its life time.

In the embodiments described in WO 2010/130717, the planet carrier can simply be removed so as to allow easy access to the remainder of the gearing. However, when the complete gearbox has to be removed, it still may be an expensive and time consuming action as the complete gearbox still cannot easily and completely be removed.

Another disadvantage of the embodiments described in WO 2010/130717 is that, due to rotor loads, the frame 2 can deform, which can have a negative effect on the bearings 3. This can be solved by making the frame more stiff, which will increase the manufacturing cost, and thus the capex, of the hub 1.

Another example is described in U.S. Pat. No. 6,232,673. This document describes a hub 101 of a rotor employed in a wind-power plant (see FIG. 3). The hub 101 is provided with accommodations 102 for blades and is accommodated in a large-scale roller bearing 103 which is attached to a rotor support 104. The rotor support 104 is connected to a mast (not shown) by way of an azimuth bearing 105. The roller bearing 103 has a stationary outer ring rigidly fastened to the rotor support 104 and a rotating inner ring 107 onto which the hub 101 is screwed. The wind-power plant also includes a transmission in the form of a two stage planetary gear comprising an input stage 109 and an output stage 110. The axle of the sun wheel in input stage 109 constitutes the gear's output shaft and is coupled to the shaft of a generator 111.

The inner ring 107 in roller bearing 103 is connected to the hollow wheel 113 in input stage 109. This hollow wheel 113 is connected to another hollow wheel 114 in output stage 110 in the planetary gear's rotating housing 115. Planetary support 116 forwards the reaction torque deriving from the planetary gear into the rotor support 104.

The generator 111 is screwed onto the stationary planetary support in input stage 109 by which the planetary gear and generator 111 are combined into a single drive-train module. This module is connected to rotor support 104 by way of vibration suppressors 117. The wind-power plant furthermore comprises mounting rails 118 for installing and removing the module from the hub 101.

The wind-power plant's modular construction allows the planetary gear and its subassemblies and generator 111 to be removed from the mast by a crane individually or as a whole and be replaced. This can, especially for offshore applications, reduce the expense of maintaining a wind-power plant.

For removing the planetary gear and generator 111 the nacelle has to be opened, such that a crane can be attached to the planetary gear and generator 111. Furthermore, for being removed, the planetary gear and generator 111 have to be displaced through the nacelle to the back of the nacelle. Consequently, other parts, such as for example a lubrication system or a converter, which are present in the nacelle also have to be displaced. Moreover, the planetary gear cannot be removed without having to remove the generator 111.

SUMMARY OF THE INVENTION

The present invention provides a wind turbine nacelle for being mounted on a tower of a wind turbine. The wind turbine nacelle comprises a nacelle frame and a drive train comprising at least a gearbox. Attached thereto, the nacelle has a rotor comprising a rotor hub supported by at least one rotor bearing and one or more blades. The at least one rotor bearing is supported by a tubular part at an end of the nacelle frame furthest away from the tower when mounted on the tower. In the wind turbine nacelle according to embodiments of the invention the gearbox comprises a gearbox housing which does not constitute part of the nacelle frame. The gearbox housing is rigidly and axially connected to the nacelle frame by a gearbox flange connected to a nacelle frame flange, whereby a side of the gearbox flange that is located furthest away from the input side of the gearbox as seen in a direction along a reference axis from input to output of the gearbox is connected to an end of the nacelle frame flange furthest away from the tower of the wind turbine. Furthermore, an input shaft of the gearbox is connected to the rotor hub via a separate connection part.

With separate connection part is meant that the connection part which connects the input shaft of the gearbox with the rotor hub is formed by a part that does not constitute part of the gearbox housing or rotor hub.

According to embodiments of the invention, the input shaft can, for example, drive the planet carrier or can drive the ring gear, or the input shaft can be the planet carrier or can be the ring gear.

In a wind turbine nacelle according to embodiments of the invention, the drive train is mounted to the nacelle frame from outside the nacelle. In other words, the drive train is provided to the nacelle frame via the front of the nacelle, which is the side furthest away from the tower of the wind turbine. This facilitates replacement of (parts of) the drive train and significantly reduces down time of the wind turbine when such replacement is required.

The connection between the rotor hub and the gearbox may be flexible. Such flexibility can be obtained in different ways. According to embodiments of the invention, the separate connection part may be flexible. According to other embodiments of the invention, flexibility may be obtained by implementing the bolts which connect the separate connection part to the rotor hub and the input shaft of the gearbox as rubber bushings.

According to embodiments of the invention, the gearbox may be axially displaced with respect to a centre of the rotor hub in a direction away from the tower of the wind turbine.

The gearbox may be a single stage planetary gearbox comprising a first planetary gear stage. According to embodiments of the invention, the first planetary gear stage may be located outside the nacelle frame. According to these embodiments, the gearbox flange may be located at the output side of the gearbox. However, according to other embodiments, the complete gearbox, and thus the first planetary gear stage may be located inside the nacelle frame. In such cases, the gearbox flange may be located at the input side of the gearbox.

According to other embodiments, the gearbox may be a dual stage planetary gearbox comprising a first planetary gear stage and a second planetary gear stage. According to embodiments of the invention, the first planetary gear stage of the gearbox may be located outside the nacelle frame. According to other embodiments, the first planetary gear stage and the second planetary gear stage of the gearbox may be located outside the nacelle frame. According to these embodiments, the gearbox flange may be located at the end of the first planetary gear stage or may be located at the end of the second planetary gear stage, or thus at the output side of the gearbox. According to still further embodiments, the complete gearbox, and thus the first planetary gear stage and the second planetary gear stage may be located inside the nacelle frame. In such cases, the gearbox flange may be located at the input side of the gearbox.

The drive train may furthermore comprise a generator located in the nacelle frame. The generator may have a generator housing which does not constitute part of the nacelle frame. According to embodiments of the invention, the weight of the generator may be supported by connection parts which connect the generator to the nacelle frame. According to other embodiments, the generator may be connected to the gearbox housing, or in other words, the weight of the generator may be supported by the gearbox housing. According to still further embodiments of the invention, a rotor of the generator may be connected to an output shaft of the gearbox.

The wind turbine nacelle may furthermore comprise a crane on the nacelle frame. The crane may be a permanent crane which is permanently positioned on the nacelle frame or may be a removable crane which can be provided on the nacelle frame whenever this is required.

The wind turbine nacelle may furthermore comprise an access platform for improving accessibility of parts of the wind turbine nacelle located outside the wind turbine nacelle such as, for example, the bolts for connecting the separate connection part to the rotor hub and the input shaft of the gearbox.

BRIEF DESCRIPTION OF THE DRAWINGS

It has to be noted that same reference signs in the different figures refer to same, similar or analogous elements.

FIG. 1 to FIG. 3 illustrate wind turbine nacelles according to the prior art.

FIG. 4 shows a wind turbine nacelle according to an embodiment of the present invention.

FIG. 5a, FIG. 5b and FIG. 5c show embodiments of gearboxes that can be used with a wind turbine nacelle according to embodiments of the present invention.

FIG. 6 to FIG. 12 illustrate wind turbine nacelles according to different embodiments of the present invention.

DESCRIPTION OF ILLUSTRATIVE EMBODIMENTS

Figure 7:
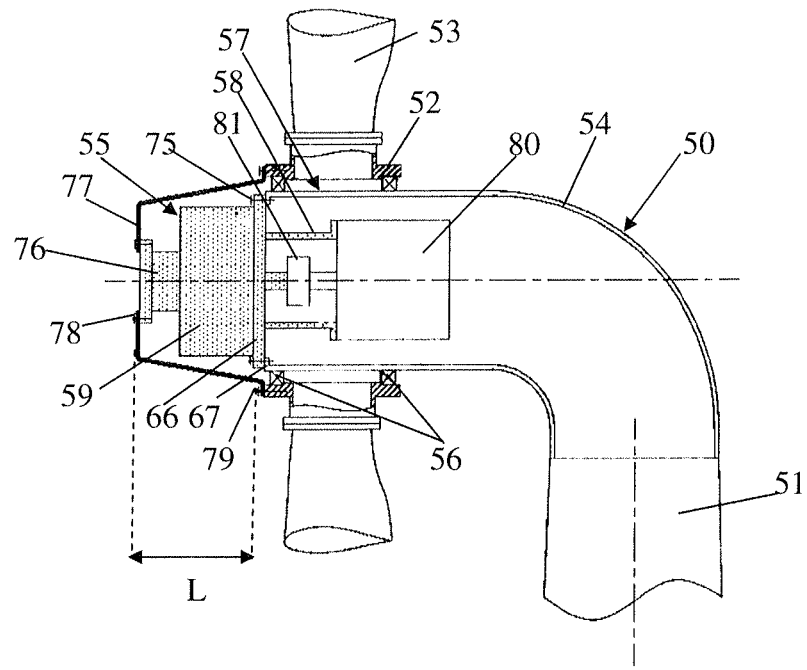

In the description different embodiments will be used to describe the invention. Therefore reference will be made to different drawings. It has to be understood that these drawings are intended to be non-limiting, the invention is only limited by the claims. The drawings are thus for illustrative purposes, the size of some of the elements in the drawings may be exaggerated for clarity purposes.

The term "comprising" is not to be interpreted as limiting the invention in any way. The term "comprising", used in the claims, is not intended to be restricted to what means is described thereafter; it does not exclude other elements, parts or steps.

The term "connected" as used in the claims and in the description has not to be interpreted as being restricted to direct connections, unless otherwise specified. Thus, part A being connected to part B is not limited to part A being in direct contact to part B, but also includes indirect contact between part A and part B, in other words also includes the case where intermediate parts are present in between part A and part B.

Not all embodiments of the invention comprise all features of the invention. In the following description and claims, any of the claimed embodiments can be used in any combination.

The present invention provides a wind turbine nacelle for being mounted on a tower of a wind turbine. The wind turbine nacelle comprises a nacelle frame and a drive train comprising at least a gearbox, and has attached thereto a rotor comprising a rotor hub supported by at least one rotor bearing and one or more blades. The rotor bearing is supported by a tubular part at an end of the nacelle frame located, when mounted on the tower, furthest away from the tower. According to embodiments of the invention:
- the gearbox comprises a gearbox housing which does not constitute part of the nacelle frame,
- the gearbox housing is rigidly and axially connected to the nacelle frame by a gearbox flange connected to a nacelle frame flange, whereby a side of the gearbox flange that is located furthest away from the input side of the gearbox as seen in a direction along a reference axis from input to output of the gearbox is connected to an end of the nacelle frame flange furthest away from the tower the wind turbine, and
- an input shaft of the gearbox is connected to the rotor hub via an separate connection part.

With separate connection part is meant that the connection part which connects the input shaft of the gearbox with the rotor hub is formed by a part that does not constitute part of the gearbox housing or rotor hub.

According to embodiments of the invention, the input shaft can, for example, drive the planet carrier or can drive the ring gear, or the input shaft can be the planet carrier or can be the ring gear.

Hereinafter, a wind turbine nacelle according to different embodiments will be described. It has to be understood that this is only for the ease of explanation and that these embodiments are not intended to limit the invention in any way.

FIG. 4 illustrates a wind turbine nacelle 50 according to an embodiment of the present invention. The wind turbine nacelle 50 is mounted on a tower 51 of a wind turbine. Attached to the wind turbine nacelle 50 there is a rotor. The rotor comprises a rotor hub 52 with rotor blades 53. The wind turbine nacelle 50 comprises a nacelle frame 54 and a drive train comprising a gearbox 55 and a generator 80.

The rotor hub 52 is supported by at least one rotor bearing 56 which is supported by a tubular part 57 at an end of the nacelle frame 54 furthest away from the tower 51. In the example given in FIG. 4, the rotor hub 52 is supported by two rotor bearings 56. However, according to other embodiments of the invention (not shown in the drawings), the rotor hub 52 may be supported by only one rotor bearing 56.

The gearbox 55 comprises a gearbox housing 58 (see e.g. FIG. 5a) which does not constitute part of the nacelle frame 54. This means that the gearbox 55 has its own, separate housing 58, which is different from the nacelle frame 54, or in other words is formed as a part different from the nacelle frame 54. The gearbox housing 58 may also be referred to as static part of the gearbox 55.

According to embodiments of the invention, the gearbox 55 may, for example, be a single stage planetary gearbox 55, which means that the gearbox 55 comprises only a first planetary gear stage 59 (see FIG. 5a). The gearbox housing 58 is indicated in this drawing by the black parts. As known by a person skilled in the art, a planetary gear stage 59 may comprise a ring gear 60, a sun gear 61, planet gears 62 mounted on planet shafts 63 by means of planet bearings (not shown in the drawings) and a planet carrier 64 supported by planet carrier bearings 65. The gearbox 55 has an input side I and an output side O. The input side I of the gearbox 55 may also be referred to as low speed side and is rotor driven. The output O side may also be referred to as high speed side and drives the generator 80 of the wind turbine. In the example given in FIG. 5a, the gearbox housing 58 comprises, at the output side O of the gearbox 55, a gearbox flange 66 for connecting the gearbox housing 58 to a flange 67 of the nacelle frame 54. According to embodiments of the invention, the gearbox 55 may furthermore also comprise at least one parallel stage (not shown in the drawings).

According to other embodiments of the invention, the gearbox 55 may be dual stage planetary gearbox, which means that the gearbox 55 may comprise a first planetary gear stage 59 and a second planetary gear stage 68 (see FIG. 5b and FIG. 5c). The second planetary gear stage 68 may, similar as the first planetary gear stage 59, comprise a ring gear 69, a sun gear 70, planet gears 71 mounted on planet shafts 72 by means of planet bearings (not shown in the drawings) and a planet carrier 73 supported by planet carrier bearings 74. The gearbox housing 58 furthermore comprises a gearbox flange 66 for connecting the gearbox housing 58 to the nacelle frame flange 67. In the example given in FIG. 5b, the gearbox flange 66 may be located in between the first and second planetary gear stages 59, 68, while in the example given in FIG. 5c the gearbox flange 66 may be located at the end of the second planetary gear stage 68, or in other words may be located at the output side O of the gearbox 55. According to embodiments of the invention, the gearbox 55 may furthermore also comprise at least one parallel stage (not shown in the drawings).

It has to be understood that, in the further description of the invention, the type of gearbox 55 used in the drawings to describe particular embodiments is not intended to limit the invention in any way. The wind turbine nacelle 50 according to embodiments of the present invention may be used with any type of gearbox 55 known by a person skilled in the art.

In the example given in FIG. 4, the gearbox 55 is a single stage planetary gearbox 55, which means that the gearbox 55 comprises only a first planetary gear stage 59 as described above. According to the present embodiment, as illustrated in FIG. 4, the first planetary stage 59 of the gearbox 55 is located outside the nacelle frame 54. As a consequence hereof, the gearbox 55 is axially displaced with respect to a centre of the rotor hub 52 in a direction away from the tower 51. The gearbox housing 58 is axially connected to the nacelle frame 54. This is done by connecting the gearbox flange 66 to the nacelle frame flange 67. Hereby, that side of the gearbox flange 66 that is located furthest away from the input side I of the gearbox 55 as seen in a direction along a reference axis X from input I to output O of the gearbox 55 is connected to an end of the nacelle frame flange 67 furthest away from the tower 51 of the wind turbine. In the example given, the gearbox flange 66 is located at the end of the first planetary gear stage 59, or in other words at the output O of the gearbox 55. The connection between the gearbox flange 66 and the nacelle frame flange 67 is, according to the invention, a rigid connection and may, for example, be a bolt connection 75.

The gearbox flange 66 is a disc shaped part having an inner diameter as required for supporting the planet carrier bearing 65 (see e.g. FIG. 5a). The disc shaped gearbox flange 66 is more rigid than the tubular part 57 of the nacelle frame 54 to which it is bolted rigidly. This implies that when the gearbox 55 is mounted to the nacelle frame 54, the nacelle end furthest away from the tower 51 is stiffened. This has, amongst others, a positive effect on keeping the open tubular end 57 of the nacelle frame 54 round as rotor loads (bending moments and forces originating from the rotor) are applied to the nacelle frame 54 via the at least one rotor bearing 56, which means that the nacelle frame 54 is less subject to deformation due to rotor loads compared to prior art nacelles. This in turn could have a positive effect on the at least one rotor bearing 56. In case the rotor hub 52 is supported by two rotor bearings 56, as illustrated in FIG. 4, this effect will be the highest on the rotor bearing 56 located closest to the connection between the gearbox flange 66 and the nacelle frame flange 67.

The gearbox flange 66 thus contributes in making the tubular part 57 at the end of the nacelle frame 54 furthest away from the tower 51 of the wind turbine more stiff and in that way helps to support the rotor hub 52 and prevents the tubular part 57 of the nacelle frame 54 to deform because of rotor loads.

In other words, at the moment the gearbox 55 is flanged to the nacelle frame 54, the nacelle frame 54 is completed with the gearbox flange 66, in this way stiffening the tubular end part 57 of the nacelle frame 54, and thereby for example enabling the tubular part 57 of the nacelle frame 54 to be made thinner or of a different material than is the case for prior art wind turbine nacelles where the gearbox flange 66 is not rigidly connected to the open tubular end 57 of the nacelle frame 54. This may have a positive aspect on the capex, and thus on the cost of energy of the wind turbine.

Furthermore, an input shaft 76 of the gearbox 55 is connected to the rotor hub 52 via a separate connection part 77. With separate connection part is meant that the connection part 77 which connects the input shaft 76 of the gearbox 55 with the rotor hub 52 is formed by a part that does not constitute part of the rotor hub 52 or gearbox housing 58. Hence, the gearbox 55, the rotor hub 52 and the connection part 77 are formed as three different parts. The separate connection part 77 may be connected to the rotor hub 52 and to the input shaft 76 via, for example, respectively bolts 78 and 79. According to embodiments of the invention, the input shaft 76 can, for example, drive the planet carrier 64 or can drive the ring gear 60, or the input shaft 76 can be the planet carrier 64 or can be the ring gear 60.

According to embodiments of the invention, the connection between the input shaft 76 of the gearbox 55 and the rotor hub 52 may be flexible. Such flexibility can be obtained in different ways. For example, according to embodiments of the invention, the separate connection part 77 may be formed by a flexible part, or in other words may itself show some degree of flexibility. Flexibility of the connection part 77 may be increased by adjusting its length L which may at least be equal to the length of the first planetary stage 59 of the gearbox 55, as is indicated in FIG. 4. Flexibility proportionally increases with length L of the connection part 77, and thus flexibility of the connection part 77 may be changed by changing the length L of the connection part 77. According to embodiments of the invention, flexibility of the connection part 77 may be changed by changing its shape. The separate connection part 74 may have any suitable rotatable symmetrical shape, of which an example which is not intended to limit the invention in any way is illustrated in FIG. 6. Another way for obtaining a flexible connection between the input shaft 76 of the gearbox 55 and the rotor hub 52 may, for example, be by implementing the bolts 78 and 79 as rubber bushings.

According to embodiments of the invention and as described above, the gearbox 55 has two important connections. The static part of the gearbox 55, i.e. the gearbox housing 58 is rigidly connected to the tubular end 57 of the nacelle frame 54 and the rotating part of the gearbox 55, i.e. the input shaft 76 is connected to the rotor hub 52 via a separate connection part 77.

According to embodiments of the invention, the drive train may furthermore comprise a generator 80. The generator 80 has a generator housing (not shown in the drawings) which does not constitute part of the nacelle frame 54. The generator 80 is connected to the gearbox 55 via coupling 81. The generator 80 is located in the nacelle frame 54. In the example given in FIG. 4 and FIG. 6 the generator 80 may be connected to the nacelle frame 54 via connection parts 82. In the drawings, these connection parts 82 are illustrated as a kind of "feet" which support the weight of the generator 80. However, the connection parts 82 may be any type of connection parts 82 connecting the generator 80 to the nacelle frame 54 as known by a person skilled in the art.

According to other embodiments, the generator 80 may, instead of being connected to the nacelle frame 54 via connection parts 82, also be connected to the gearbox housing 58 as illustrated in FIG. 7. In that case, the weight of the generator 80 is supported by the gearbox housing 58. According to still further embodiments of the invention, a rotor of the generator 80 may be supported by an output shaft of the gearbox 55 (see further).

As already described earlier, according to other embodiments of the invention, the gearbox 55 may also be a dual stage planetary gearbox (see FIG. 8 to FIG. 12). In that case, the gearbox 55 comprises a first and second planetary stage 59, 68, as was described with respect to FIG. 5b and FIG. 5c.

Similar as for the wind turbine nacelle 50 described with respect to FIG. 4, the wind turbine nacelle 50 illustrated in FIG. 8 to FIG. 12 is mounted on a tower 51 of the wind turbine. Attached to the wind turbine nacelle 50 there is a rotor. The rotor comprises a rotor hub 52 with rotor blades 53. The wind turbine nacelle 50 comprises a nacelle frame 54 and a drive train comprising a gearbox 55 and a generator 80. The rotor hub 52 is supported by at least one rotor bearing 56 which is supported by a tubular part 57 at an end of the nacelle frame 54 furthest away from the tower 51. In the example given in FIG. 8 to FIG. 12, the rotor hub 52 is supported by two rotor bearings 56. However, according to other embodiments of the invention (not shown in the drawings), the rotor hub 52 may be supported by only one rotor bearing 56. The gearbox 55 has its own, separate housing 58, which is different from the nacelle frame 54.

Figure 8:
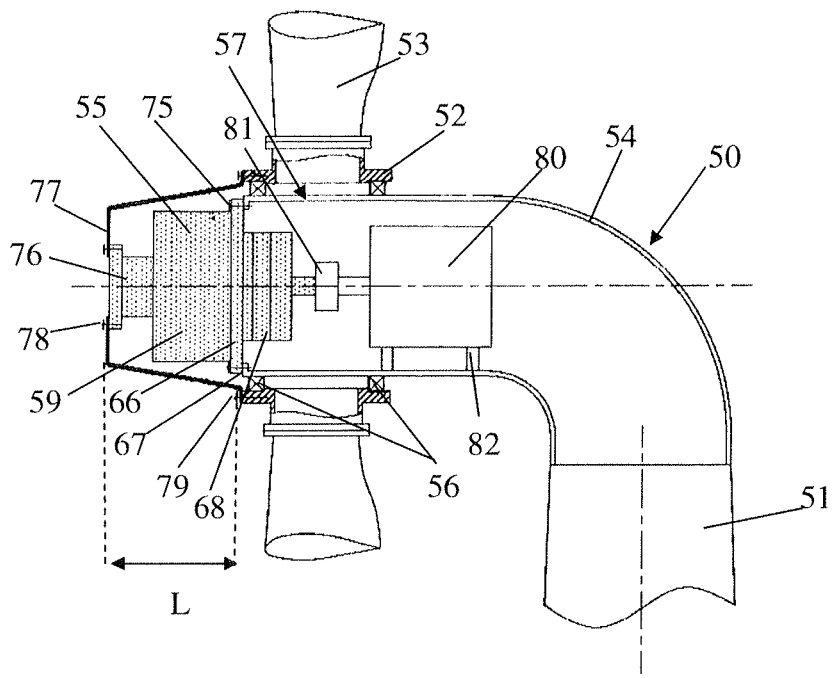
Figure 9:
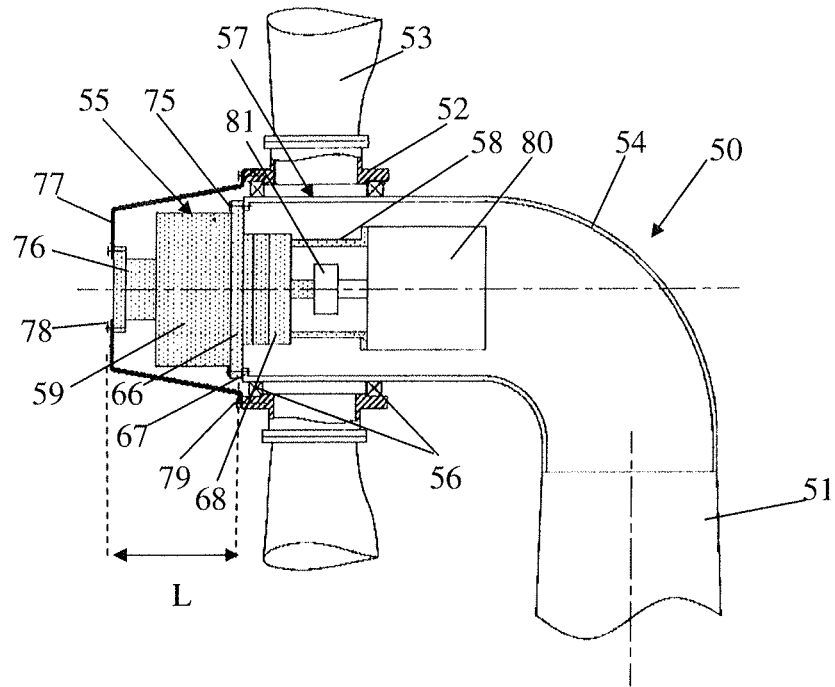
Figure 10:
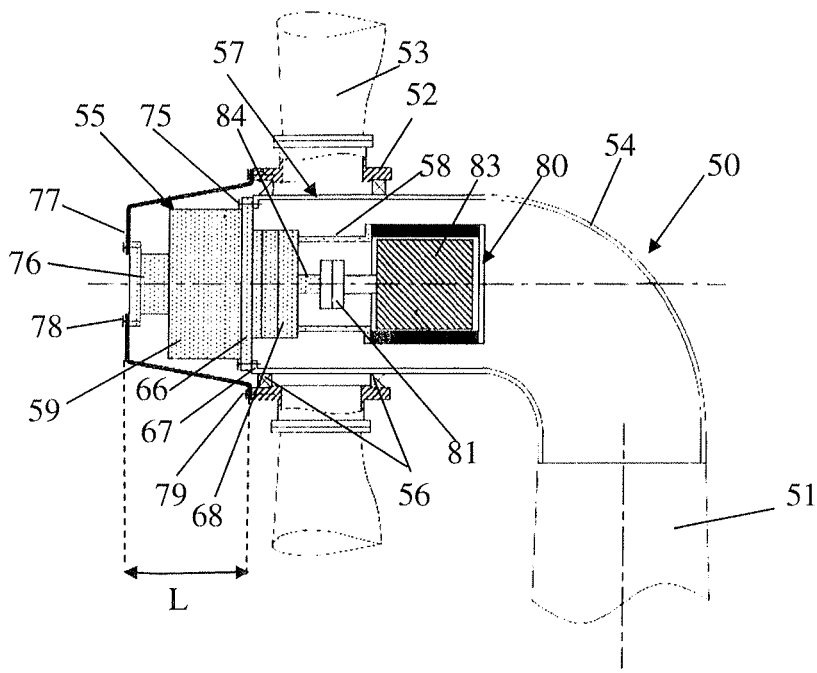

In the examples given in FIG. 8 to FIG. 10 the first planetary gear stage 59 is located substantially outside the rotor hub 52 and the second planetary gear stage 68 is located substantially inside the rotor hub 52. The gearbox housing 58 is axially connected to the nacelle frame 54. This is done by connecting the gearbox flange 66, which is in the example given located between the first and second planetary gear stage 59, 68, to the nacelle frame flange 67. Hereby, that side of the gearbox flange 66 that is located furthest away from the input side I of the gearbox 55 as seen in a direction along a reference axis from input I to output O of the gearbox 55 is connected to an end of the nacelle frame flange 67 furthest away from the tower 51 of the wind turbine. The connection between the gearbox flange 66 and the nacelle frame flange 67 is a rigid connection and may, for example, be a bolt connection 75.

In a same way as described above with respect to FIG. 4, the gearbox flange 66 contributes in making the tubular part 57 at the end of the nacelle frame 54 furthest away from the tower 51 of the wind turbine more stiff and in that way helps to support the rotor hub 52 and prevents the tubular part 57 of the nacelle frame 54 to deform because of rotor loads.

At the moment the gearbox 55 is flanged to the nacelle frame 54, the nacelle frame 54 is completed with the gearbox flange 66, in this way stiffening the tubular end part 57 of the nacelle frame 54, and thereby for example enabling the tubular part 57 of the nacelle frame 54 to be made thinner or of a different material than is the case for prior art wind turbine nacelles where the gearbox flange 66 is not rigidly connected to the open tubular end 57 of the nacelle frame 54. This may have a positive aspect on the capex, and thus on the cost of energy of the wind turbine.

Furthermore, an input shaft 76 of the gearbox 55 is connected to the rotor hub 52 via a separate connection part 77. The separate connection part 77 may be connected to the rotor hub 52 and to the input shaft 76 via, for example, respectively bolts 78 and 79. The connection between the rotor hub 52 and the input shaft 76 of the gearbox 55 may be flexible. As described above, flexibility may be obtained in different ways. For example, flexibility may be obtained by adjusting the length L or by changing the shape of the separate connection part 77 or by providing the bolts 78 and 79 as rubber bushings. According to embodiments of the invention, the input shaft 76 can, for example, drive the planet carrier 64 or can drive the ring gear 60, or the input shaft 76 can be the planet carrier 64 or can be the ring gear 60.

The drive train may furthermore comprise a generator 80 located in the nacelle frame 54. The generator 80 has a generator housing (not shown in the drawings) which does not constitute part of the nacelle frame 54. In the examples given in FIG. 8 to FIG. 10 the gearbox 55 is connected to the generator 80 via coupling 81. Again, similar as described above, the weight of the generator 80 may be supported by connection parts 82 (FIG. 8) or by the gearbox housing 58 (FIG. 9). According to still further embodiments, the generator 80 may be supported the gearbox housing 58 and a rotor 83 of the generator 80 may be supported by an output shaft 84 of the gearbox 55 (see FIG. 10).

Figure 11:
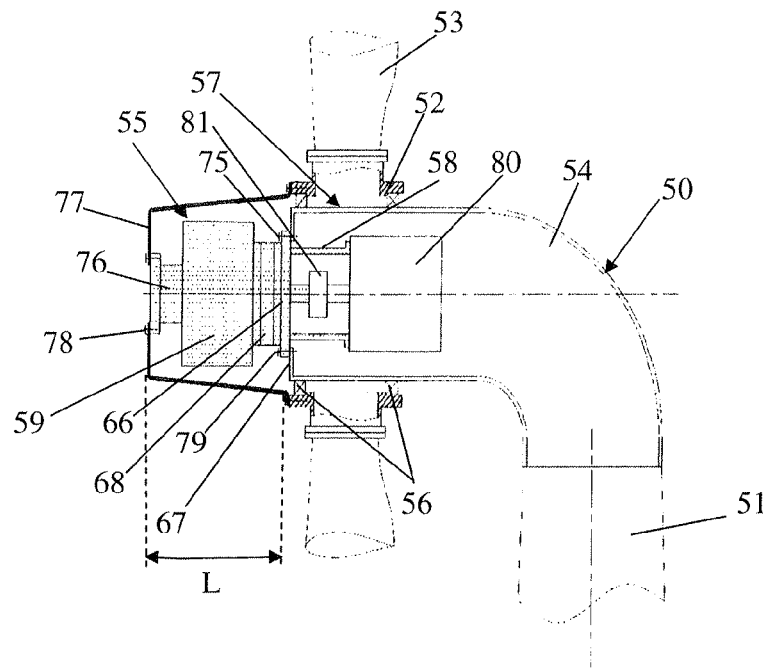

Instead of only the first planetary gear stage 59 being located substantially outside the rotor hub 52 as was the case in FIG. 8 to FIG. 10, according to further embodiments of the invention, both the first and second planetary gear stage 59, 68 of the gearbox 55 may be located substantially outside the rotor hub 52, as is illustrated in FIG. 11.

Similar as described for the above embodiments, the gearbox housing 58 is axially connected to the nacelle frame 54. This is done by connecting the gearbox flange 66, which in the present example is located at the end of the second planetary gear stage 68 or, in other words, at the output O of the gearbox 55, to the nacelle frame flange 67. Hereby, that side of the gearbox flange 66 that is located furthest away from the input side I of the gearbox 55 as seen in a direction along a reference axis from input I to output O of the gearbox 55 is connected to an end of the nacelle frame flange 67 furthest away from the tower 51 of the wind turbine. The connection between the gearbox flange 66 and the nacelle frame flange 67 is a rigid connection and may, for example, be a bolt connection 75.

In a same way as described for the above embodiments, the gearbox flange 66 contributes in making the tubular part 57 at the end of the nacelle frame 54 furthest away from the tower 51 of the wind turbine more stiff and in that way helps to support the rotor hub 52 and prevents the tubular part 57 of the nacelle frame 54 to deform because of rotor loads.

Furthermore, an input shaft 76 of the gearbox 55 is connected to the rotor hub 52 via a separate connection part 77. The separate connection part 77 may be connected to the rotor hub 52 and to the input shaft 76 via, for example, respectively bolts 78 and 79. Similarly as described with respect to FIG. 3, the connection between the rotor hub 52 and the input shaft 76 of the gearbox 55 may be flexible. This may be obtained by adjusting the length L of the separate connection part 77 or by providing the bolts 78 and 79 as rubber bushings. In the example given in FIG. 11, the separate connection part 77 may have a length L which is at least equal to the sum of the length of the first planetary gear stage 59 and the length of the second planetary gear stage 68.

The drive train may furthermore comprise a generator 80 located in the nacelle frame 54. The generator 80 has a generator housing (not shown in the drawings) which does not constitute part of the nacelle frame 54. The gearbox 55 is connected to the generator 80 via coupling 81. In the example given in FIG. 11, the weight of the generator 80 is supported by the gearbox housing 58. However, according to other embodiments of the invention and similar as illustrated in FIG. 4 and FIG. 8, the generator 80 may also be connected to the nacelle frame 54 via connection parts 82. According to still further embodiments and as illustrated in FIG. 10, a rotor of the generator 80 may be connected to an output shaft of the gearbox 55.

Figure 12:
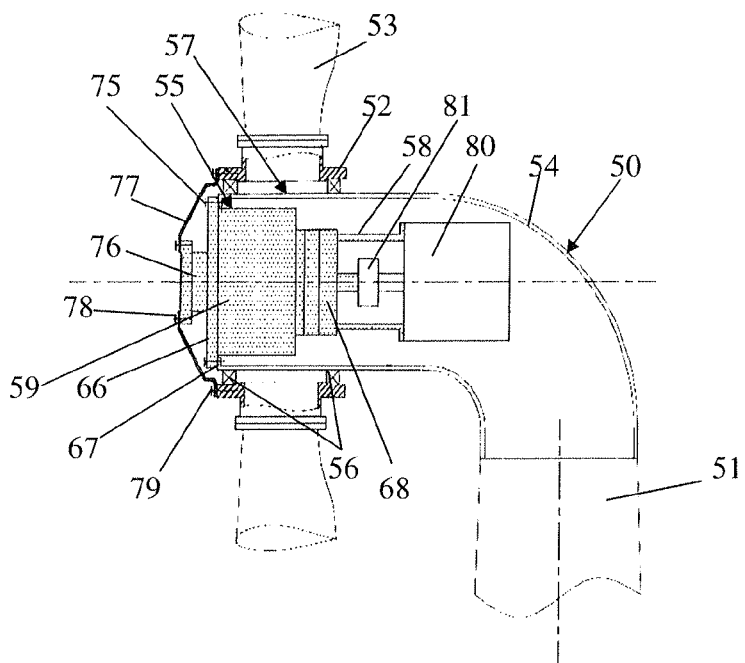

In the above described embodiments, at least the first planetary gear stage 59 is located outside the rotor hub 52. However, this is not necessarily so. According to embodiments of the invention, substantially the complete gearbox 55, and thus the first and second planetary gear stage 59, 68 of the gearbox 55, may be located in the rotor hub 52 as illustrated in FIG. 12.

Similar as in the embodiments above, the gearbox housing 58 is axially connected to the nacelle frame 54. This is done by connecting the gearbox flange 66, which in the present example is located at the input I of the gearbox 55, to the nacelle frame flange 67. Hereby, that side of the gearbox flange 66 that is located furthest away from the input side I of the gearbox 55 as seen in a direction along a reference axis from input I to output O of the gearbox 55 is connected to an end of the nacelle frame flange 67 furthest away from the tower 51 of the wind turbine. The connection between the gearbox flange 66 and the nacelle frame flange 67 is a rigid connection and may, for example, be a bolt connection 75.

In a same way as described with respect to FIG. 4, the gearbox flange 66 contributes in making the tubular part 57 at the end of the nacelle frame 54 furthest away from the tower 51 of the wind turbine more stiff and in that way helps to support the rotor hub 52 and prevents the tubular part 57 of the nacelle frame 54 to deform because of rotor loads.

At the moment the gearbox 55 is flanged to the nacelle frame 54, the nacelle frame 54 is completed with the gearbox flange 66, in this way stiffening the tubular end part 57 of the nacelle frame 54, and thereby for example enabling the tubular part 57 of the nacelle frame 54 to be made thinner or of a different material than is the case for prior art wind turbine nacelles where the gearbox flange 66 is not rigidly connected to the open tubular end 57 of the nacelle frame 54. This may have a positive aspect on the capex, and thus on the cost of energy of the wind turbine.

Furthermore, an input shaft 76 of the gearbox 55 is connected to the rotor hub 52 via a separate connection part 77. The separate connection part 77 may be connected to the rotor hub 52 and to the input shaft 76 via, for example, respectively bolts 78 and 79. The connection between the rotor hub 52 and the input shaft 76 of the gearbox 55 may be flexible. This may be obtained by adjusting the length L of the separate connection part 77 or by providing the bolts 78 and 79 as rubber bushings. According to embodiments of the invention, the input shaft 76 can, for example, drive the planet carrier 64 or can drive the ring gear 60, or the input shaft 76 can be the planet carrier 64 or can be the ring gear 60.

The drive train also comprises a generator 80 which is connected to the gearbox 55 via coupling 81. The generator 80 is located in the nacelle frame 54 and has a generator housing which does not constitute part of the nacelle frame 54. In the example given in FIG. 12, the weight of the generator 80 is supported by the gearbox housing 58. However, according to other embodiments of the invention, the generator 80 may also be connected to the nacelle frame 54 via connection parts 82. According to still further embodiments, a rotor of the generator 80 may be connected to an output shaft of the gearbox 55.

Figure 13A:
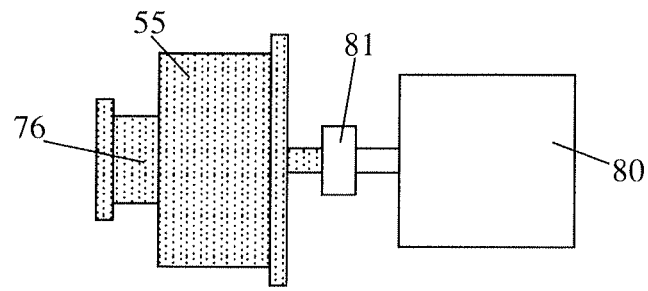
FIG. 13a and FIG. 13b schematically illustrate possible implementations of a coupling between gearbox and generator in a drive train according to embodiments of the invention.
Figure 13B:
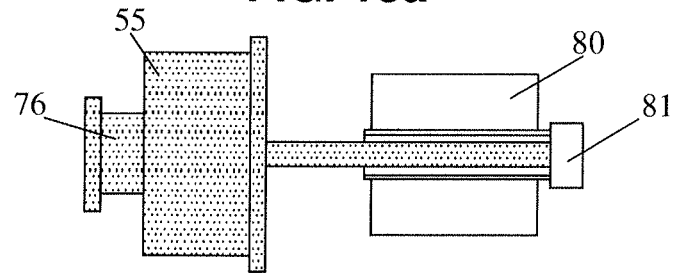

In all the above described embodiments, the coupling 81 between the gearbox 55 and the generator 80 is located in between the gearbox 55 and the generator 80 as is schematically illustrated in FIG. 13*a*. However, according to embodiments of the invention, the coupling 81 may also be located at an output of the generator 80, as is illustrated in FIG. 13*b*.

Figure 14:
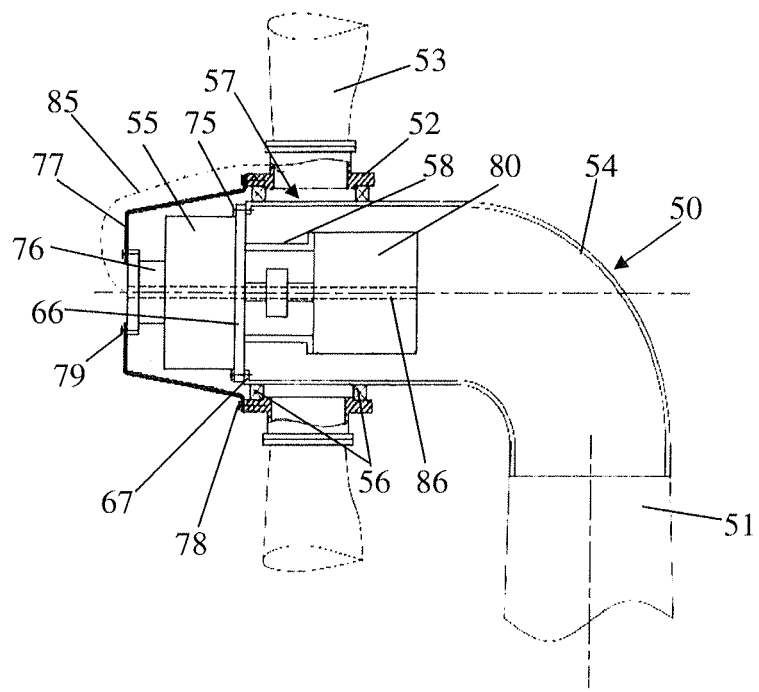
FIG. 14 illustrates wind turbine nacelles according to different embodiments of the present invention.

The wind turbine nacelle 50 may furthermore comprise electrical and/or hydraulic cabling 85 for driving, for example, the pitch mechanism at the rotor hub 52. This cabling 85 extends from a side of the nacelle frame 54 closest to the wind turbine tower 51 through an energy tube 86 towards a side of the nacelle frame 54 furthest away from the wind turbine tower 51, thereby extending through the drive train, i.e. through the gearbox 55 and the generator 80, to be connected to the rotor hub 52 (see FIG. 14). In that way, the electrical and/or hydraulic cabling 85 can rotate together with the rotor hub 52.

Alternatively for electrical cabling only, according to other embodiments of the invention, slip rings may be provided between the static part and the rotating part of the drive train (not shown in the figures).

In a wind turbine nacelle 50 according to embodiments of the invention, as described in the embodiments above, the gearbox 55 is connected to the nacelle frame 54 by bolting that side of the gearbox flange 66 that is located furthest away from the input side I of the gearbox 55 as seen in a direction along a reference axis from input I to output O of the gearbox 55 to an end of the nacelle frame flange 67 furthest away from the tower 51 of the wind turbine This means that the drive train is mounted to the nacelle frame 54 from outside the nacelle 50. In other words, the drive train is provided to the nacelle frame 54 via the front of the nacelle 50, which is the side furthest away from the tower 51 of the wind turbine.

In a wind turbine nacelle 50 according to embodiments of the invention, only torque is transferred through the drive train. This is because of the presence of the separate connection part 77 connecting the rotor hub 52 to the gearbox 55. Bending moments and other forces originating from the rotor hub 52 are transferred over the nacelle frame 54. As only torque is transferred over the drive train, different parts of the drive train are less subject to deformation and wear and thus will have a longer life cycle.

As already described earlier, in a wind turbine nacelle 50 according to embodiments of the invention the drive train is provided in the nacelle 50 at the front side, i.e. at a side of the nacelle 50 furthest away from the tower 51 of the wind turbine. This makes servicing and maintenance of the wind turbine much easier than for currently available turbines in case replacement of the drive train should be required. This is because in a nacelle 50 according to embodiments of the invention, if required, the gearbox 55 alone or the complete drive train, i.e. the gearbox 55 and generator 80 can be easily removed from the nacelle 50. In that way, downtime of the wind turbine due to servicing and maintenance activities can be significantly reduced, which is economically of high importance and which contributes to reduce the cost of energy of the wind turbine by reducing the O&M costs. Another important advantage according to embodiments of the invention is that the drive train can be removed from the nacelle 50 without having to remove the rotor hub 52 and/or blades 53. Furthermore, when having to remove the gearbox 55 or the gearbox 55 and the generator 80 from the wind turbine nacelle 50, the nacelle 50 does not have to be opened and other parts, such as for example a converter, present in the nacelle 50 does not have to be displaced.

Figure 15A:
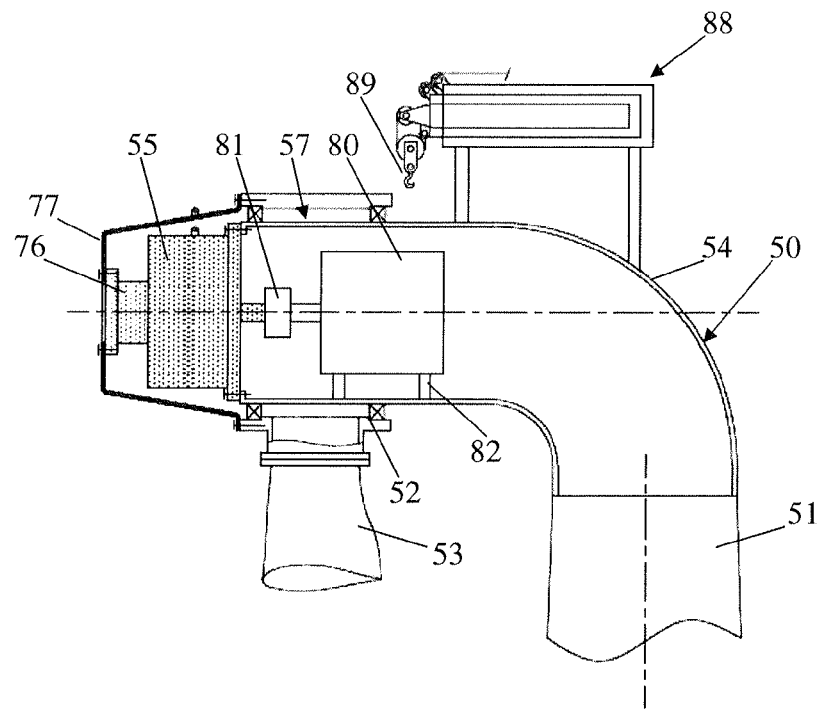
FIG. 15a, FIG. 15b, FIG. 15c and FIG. 16 illustrate a possible implementation of a crane on a wind turbine nacelle according to embodiments of the invention.

For removing the drive train from the nacelle 50, according to embodiments of the invention, the wind turbine nacelle 50 may furthermore comprise a crane 88 located on top of the nacelle frame 54. This is illustrated in FIG. 15*a*. The presence of such crane 88 can significantly simplify maintenance and servicing activities to be performed to, for example, (parts of) the drive train of the wind turbine nacelle 50 and thus can also significantly reduce time for such maintenance and servicing activities and thus significantly reduce O&M costs.

Figure 15B:
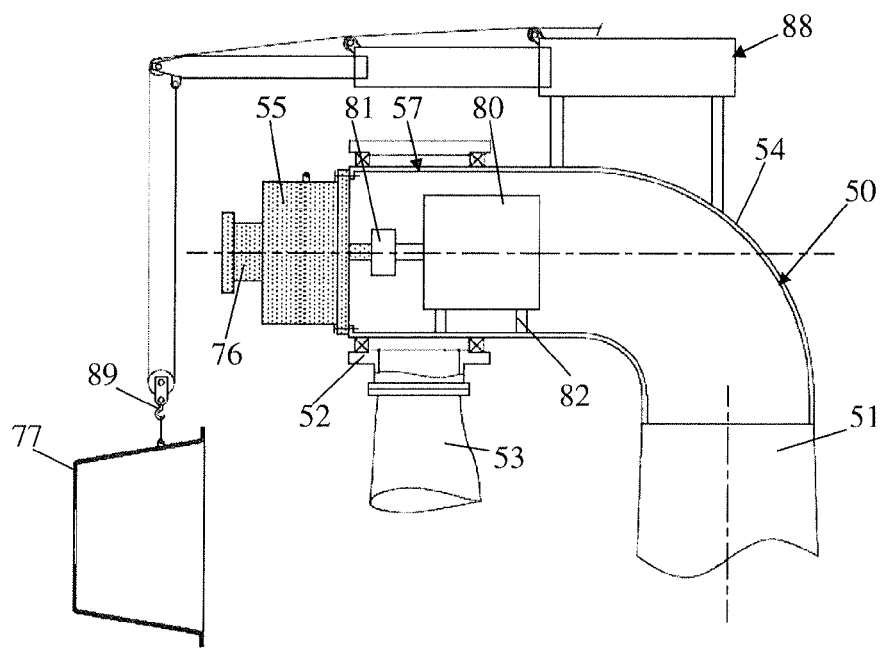
Figure 15C:
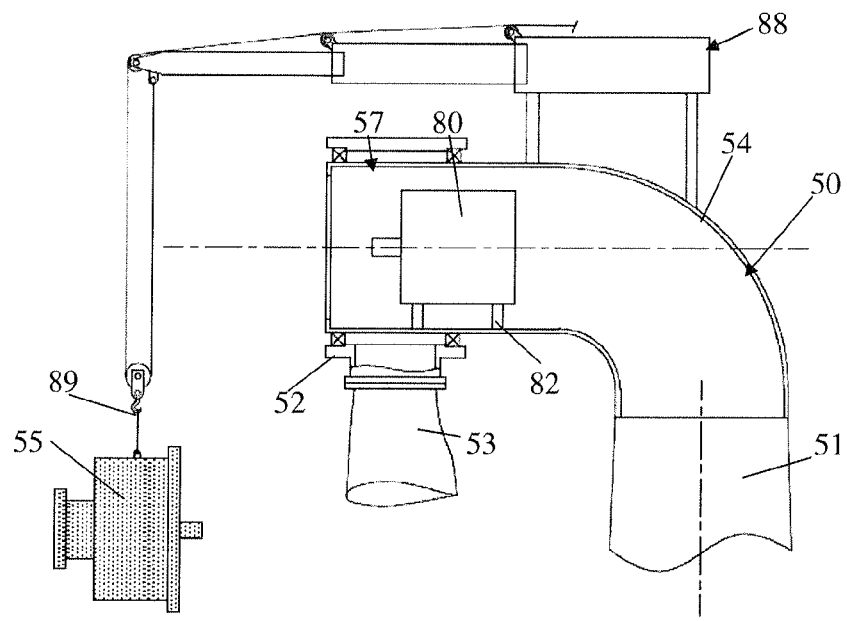
Figure 16:
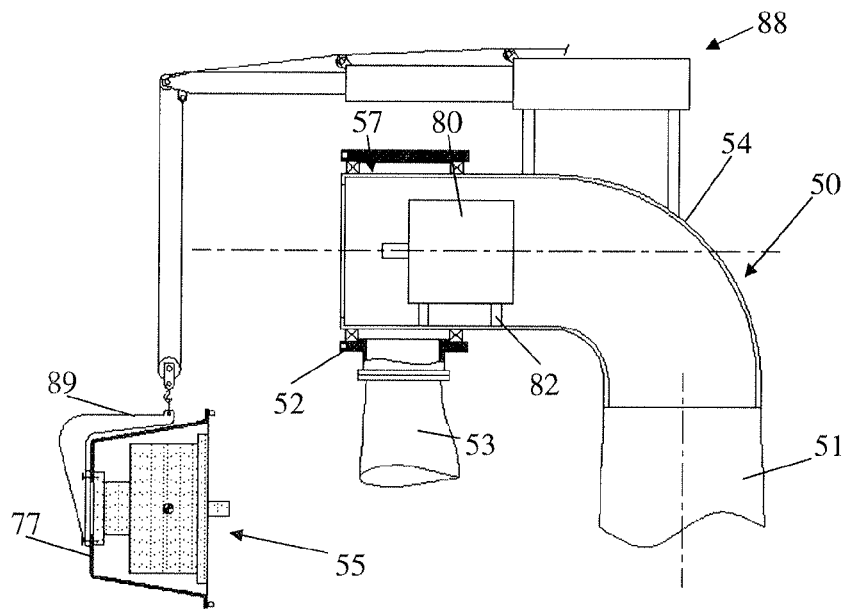

FIG. 15*b* and FIG. 15*c* illustrate the example of removal of the gearbox 55 from the nacelle 50 by using a crane 88 that is located on the nacelle frame 54. The crane 88 may, for example, be an extendable crane as is illustrated in FIG. 16*b*. When the gearbox 55 has to be removed, the crane 88 is extended such that the hook 89 of the crane 88 can first be attached to the separate connection part 77. In that way, the separate connection part 77 can be removed by lowering it from the wind turbine nacelle 50 (see FIG. 15*b*). Once the separate connection part 77 has been removed, also the gearbox 55 can be removed from the nacelle 50 in a similar way (see FIG. 15*c*).

The crane 88 on the nacelle frame 54 can be a permanent crane, which means that the crane 88 is permanently positioned on the nacelle frame 54, or can be a removable crane 88, which means that the crane 88 can be provided on the nacelle frame 54 whenever this is required. In the latter case, the crane 88 may be hoisted to the nacelle frame 54 by using a smaller crane or hoist (not shown in the drawings) that is permanently provided on the nacelle frame 54.

It has to be understood that the example given in FIG. 15*a* to FIG. 15*c* is only by way of illustration and is not intended to limit the invention in any way. Instead of only the gearbox 55, the complete drive train, i.e. gearbox 55 together with generator 80 can be removed as explained with respect to FIG. 15*a* to FIG. 15*c*. Furthermore, the crane 88 can also be implemented in a different way, as known by a person skilled in the art.

According to further embodiments, the separate connection part 77 and the gearbox 55 can together be removed in one step. In such cases, the bolts 75 connecting the gearbox flange 66 to the nacelle flange 67 are provided from the inside of the nacelle frame 54 (see FIG. 16). Before removing the separate connection part 77 and the gearbox 55, the bolts 75 are then first to be removed at the inside of the nacelle frame 54.

Figure 17:
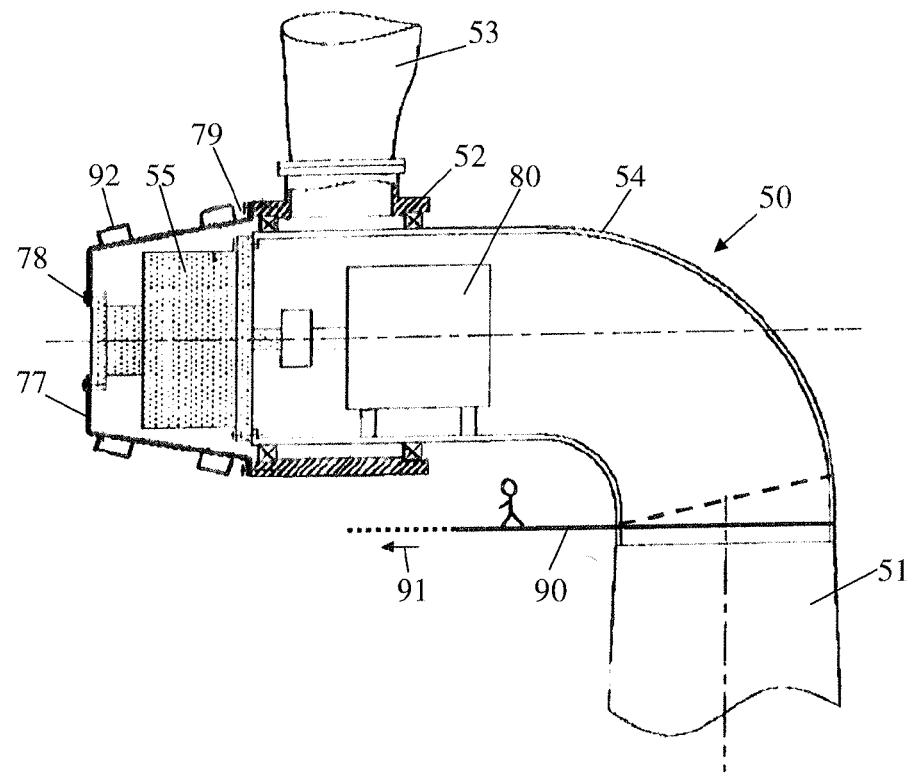
FIG. 17 illustrates a further embodiment of a wind turbine nacelle according to the invention.
Figure 18:
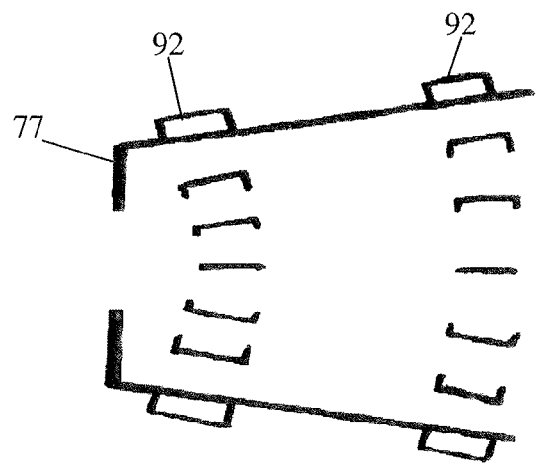
FIG. 18 illustrates a separate connection part according to an embodiment of the invention.

For improving accessibility of parts of the wind turbine nacelle 50 located and only accessible from outside the wind turbine nacelle 50 such as, for example, the bolts 78, 79 for connecting the separate connection part 77 to the rotor hub 52 and the input shaft 76 of the gearbox 55, according to embodiments of the invention an access platform 90 may furthermore be provided to the nacelle 50. FIG. 17 illustrates an implementation of such access platform 90 according to an embodiment of the invention. The access platform 90 is attached to the nacelle 50 and can be extended in a direction away from the tower 51 and towards the rotor hub 52 (indicated by arrow 91 in FIG. 17). Hand rails and steps (indicated by reference number 92) may furthermore be provided on the separate connection part 77. This is schematically illustrated in detail in FIG. 18. The hand rails and steps 92 are provided around the circumference of the separate connection part to enable access to the bolts 78, 79.

The invention claimed is:

1. A wind turbine nacelle (50) for mounting on a tower (51) of a wind turbine, the wind turbine nacelle (50) comprising:
 a nacelle frame (54) and a drive train comprising a gearbox (55), a rotor comprising a rotor hub (52) with one or more blades (53) which are both supported by at least one rotor bearing (56), the at least one rotor bearing (56) being directly supported by a tubular part (57) of the nacelle frame located at an end of the nacelle frame (54) that his farthest away from the tower (51) and adjacent a nacelle frame flange (67), when the tubular part (57) is mounted on the tower (51),
 wherein the gearbox (55) comprises a gearbox housing (58) which is separate from and does not constitute part of the nacelle frame (54), the gearbox housing radially encloses the gearbox,
 the gearbox housing (58) comprises a gearbox flange that is rigidly and axially connected to the nacelle frame flange (67) of the nacelle frame (54) such that a side of the gearbox flange (66), located farthest away from an input side (I) of the gearbox (55), as seen in a direction along a reference axis from an input (I) to an output (O) of the gearbox (55), is connected to an end of the nacelle frame flange (67) farthest away from the tower (51) of the wind turbine,
 a generator (80) is located within the nacelle frame (54) and a housing of the generator is separate from and does not constitute part of the nacelle frame (54), and
 the input is an input shaft (76) of the gearbox (55) which extends axially along the reference axis from the input side of the gearbox, a separate connection part is connected to an end of the input shaft that is axially farthest away from the output of the gearbox, and the separate connection part is connected to the rotor hub (52) for supplying rotational drive from the rotor hub (52) to the input shaft (76) of the gearbox (55), the separate connection part extends axially, and radially encloses the gearbox housing.

2. The wind turbine nacelle (50) according to claim 1, wherein a connection between the rotor hub (52) and the gearbox (55) is flexible, and the generator is supported such that the housing of the generator is radially separated from an interior surface of the nacelle frame by a gap.

3. The wind turbine nacelle (50) according to claim 2, wherein the separate connection part (77) is flexible.

4. The wind turbine nacelle (50) according to claim 2, wherein the separate connection part (77) is connected to the rotor hub (52) and the input shaft (76) of the gearbox (55) by bolts (78, 79), and the bolts (78, 79) are implemented with rubber bushings.

5. The wind turbine nacelle (50) according to claim 1, wherein the gearbox (55) is a single stage planetary gearbox comprising a first planetary gear stage.

6. The wind turbine nacelle (50) according to claim 5, wherein the first planetary gear stage (59) of the gearbox (55) is located outside the nacelle frame (54).

7. The wind turbine nacelle (50) according to claim 1, wherein the gearbox (55) is a dual stage planetary gearbox comprising a first planetary gear stage (59) and a second planetary gear stage (68).

8. The wind turbine nacelle (50) according to claim 7, wherein the first planetary gear stage (59) and the second planetary gear stage (68) of the gearbox (55) are located outside the nacelle frame (54).

9. The wind turbine nacelle (50) according to claim 1, wherein a weight of the generator (80) is supported by the gearbox housing (58).

10. The wind turbine nacelle (50) according to claim 1, wherein a weight of the generator (80) is supported by connection parts (82) which connect the generator (80) to the nacelle frame (54) such that the housing of the generator is spaced from the nacelle frame by a gap.

11. The wind turbine nacelle (50) according to claim 1, wherein a rotor (83) of the generator (80) is connected to an output shaft (84) of the gearbox (55) and coaxially aligned with the inputshaft of the gearbox.

12. The wind turbine nacelle (50) according to claim 1, wherein the wind turbine nacelle (50) further comprises a crane (88) on the nacelle frame (54).

13. The wind turbine nacelle (50) according to claim 1, wherein the wind turbine nacelle (50) further comprises an access platform (90) for improving accessibility of parts of the wind turbine nacelle (50) located outside the wind turbine nacelle (50).

14. A wind turbine nacelle (50) for mounting on a tower (51) of a wind turbine, the wind turbine nacelle (50) comprising:
 a nacelle frame (54) comprises a tubular part having first end and a second end, the first end of the tubular part comprising a nacelle frame flange and the second end of the tubular part is mounted on the tower, and a drive train comprising a gearbox (55), a rotor comprising a rotor hub (52) with at least one blade (53), the rotor hub (52) and the at least one blade (53) both being supported by at least one rotor bearing (56), and the at least one rotor bearing (56) being supported by the tubular part (57) at a location between the nacelle frame flange (67) and the tower (51), wherein the gearbox (55) comprises a gearbox housing (58) which is separate from and does not constitute part of the nacelle frame (54), the gearbox housing (58) comprises a gearbox flange which is rigidly and axially connected, via bolts, to the nacelle frame flange (67) of the nacelle frame (54) such that a side of the gearbox flange (66), located farthest away from an input side (I) of the gearbox (55), as seen in a direction along a reference axis from an input shaft (76) to an output (0) of the gearbox (55), is connected to an end of the nacelle frame flange (67) farthest away from the tower (51) of the wind turbine, a generator (80) is accommodated within the nacelle frame (54) and a housing of the generator is separated from the nacelle frame by an interstice and does not form part of the nacelle frame (54), and one axial end of a separate connection part is connected to an input shaft (76) of the gearbox (55) and an axially opposite end of the separate connection part is connected to the rotor hub (52) such that the separate connection part rotates in common with the input shaft of the gearbox and the rotor hub for supplying rotational drive from the rotor hub (52) to the input shaft (76) of the gearbox (55), and the separate connection part (77) radially surrounds the gearbox (55).

15. A wind turbine nacelle (50) for mounting on a tower (51) of a wind turbine, the wind turbine nacelle (50) comprising:

a nacelle frame (54) comprises a tublar part having opposed first and second ends, the first end of the tubular part has a nacelle flange, and the second end of the tubular part is mounted on the tower, and a drive train comprising a gearbox (55), a rotor comprising a rotor hub (52) with at least one blade (53), the rotor hub (52) and the at least one blade (53) both being supported by at least one rotor bearing (56), and the at least one rotor bearing (56) being supported by the tubular part (57) at a location between the nacelle frame flange (67) and the tower (51), when the tubular part (57) is mounted on the tower (51), wherein the gearbox (55) comprises a gearbox housing (58) which is separate from and does not constitute part of the nacelle frame (54), the gearbox housing (58) comprises a gearbox flange that is rigidly and axially connected to the nacelle frame flange (67) at the first end of the tubular part of the nacelle frame (54) such that a side of the gearbox flange (66), located farthest away from an input side (I) of the gearbox (55), as seen in a direction along a reference axis from an input shaft (76) to an output (O) of the gearbox (55), is connected to an end of the nacelle frame flange (67) farthest away from the tower (51) of the wind turbine, the gearbox flange (66) being more rigid than the nacelle frame flange (67) such that engagement of the gearbox flange (66) with the nacelle frame flange (67) stiffens and encloses the first end of the tubular part so that the nacelle frame (54) resists deformation due to rotor loads, a generator (80) is accommodated within the nacelle frame (54) and a housing of the generator is separate and spaced from the nacelle frame by a gag and does not form part of the nacelle frame (54), and one axial end of a separate connection part is abuts a first surface of the input shaft (76) of the gearbox (55) and an opposite axial end of the separate connection part is connected to the rotor hub (52) for supplying rotational drive from the rotor hub (52) to the input shaft (76) of the gearbox (55), and the separate connection part (77) radially surrounds the gearbox (55), the first surface of the input shaft faces axially away the gearbox flange.

\* \* \* \* \*